US012806848B1

(12) United States Patent
Brumbaugh

(10) Patent No.: US 12,806,848 B1
(45) Date of Patent: Nov. 24, 2026

(54) METHODS AND APPARATUSES FOR PRODUCING CORRUGATED PRODUCTS

(71) Applicant: American Containers, Inc., Plymouth, IN (US)

(72) Inventor: Philip E. Brumbaugh, Plymouth, IN (US)

(73) Assignee: American Containers, Inc., Plymouth, IN (US)

(*) Notice: Subject to any disclaimer, the term of this patent is extended or adjusted under 35 U.S.C. 154(b) by 56 days.

(21) Appl. No.: 18/623,653

(22) Filed: Apr. 1, 2024

(51) Int. Cl.
*B29C 53/26* (2006.01)
*B29C 53/04* (2006.01)
*B29C 65/02* (2006.01)

(52) U.S. Cl.
CPC ............ *B29C 53/265* (2013.01); *B29C 53/04* (2013.01); *B29C 65/022* (2013.01)

(58) Field of Classification Search
CPC ..... B29C 53/265; B29C 53/04; B29C 65/022; B65D 5/18; B65D 5/02; B31B 50/04
USPC ........................................................... 493/52
See application file for complete search history.

(56) References Cited

U.S. PATENT DOCUMENTS 4,012,996 A 3/1977 Stolkin et al.
4,200,032 A 4/1980 Roda
4,262,582 A 4/1981 Sugimoto et al.
4,733,426 A * 3/1988 George ................ C11D 17/049 510/142
5,151,075 A 9/1992 Beaulleu et al.
11,141,948 B1 10/2021 Miller et al.
2009/0049811 A1* 2/2009 Choi .................. B01D 46/0001 156/70
2009/0264271 A1 10/2009 Wiklund
2015/0107780 A1* 4/2015 Hull .................... B29C 66/8167 156/580.1
2017/0190134 A1 7/2017 van der Dong et al.
2018/0086019 A1* 3/2018 Langen ................... B31B 50/26
2018/0105316 A1* 4/2018 McMahon ............ B29C 51/006
2020/0023603 A1 1/2020 Akita et al.
2020/0171775 A1 6/2020 Graham et al.
2021/0130033 A1 5/2021 Lawrence et al.
2021/0283878 A1 9/2021 Pettersson et al.
2021/0284364 A1 9/2021 Farlotti
2021/0331827 A1 10/2021 Gressel et al.
(Continued)

FOREIGN PATENT DOCUMENTS

CN 108312653 A 7/2018
CN 208946770 U 6/2019

*Primary Examiner* — Jacob A Smith
(74) *Attorney, Agent, or Firm* — Barnes & Thornburg LLP

(57) ABSTRACT

An apparatus for producing corrugated products includes a machine having a feeding station, a folding station, and a welding station. The feeding station receives corrugated sheets, such as corrugated plastic sheets, and advances them to the folding station. The folding station folds the sheets such that at least a portion of the sheets have an area of overlap. The welding station includes a welding unit having a rotary sonic welder. The rotary sonic welder includes a welding head having a welding surface with a series of projections and recesses. The welding head is rotated and lowered so as to contact the area of overlap of the sheet passes beneath it. The welding head is actuated so as to join the portions of the sheet that contact the welding surface in the area of overlap together.

12 Claims, 10 Drawing Sheets

(56) References Cited

U.S. PATENT DOCUMENTS

| | | | |
|---|---|---|---|
| 2022/0152969 | A1 | 5/2022 | Vandenhecke |
| 2022/0266562 | A1 | 8/2022 | Brenaut et al. |

* cited by examiner

METHODS AND APPARATUSES FOR PRODUCING CORRUGATED PRODUCTS

The present invention relates to methods and apparatuses for manufacturing corrugated products, and, in particular, to methods and apparatuses for producing corrugated plastic products by sonic welding.

BACKGROUND AND SUMMARY OF THE INVENTION

Various products, such as boxes or other packaging, are produced from corrugated materials. The materials used for these purposes include corrugated cardboard and corrugated plastic. One method currently used to produce boxes from corrugated materials is to produce a precut blank for the box from a sheet of corrugated material. For example, a sheet of corrugated material may be cut, scored or otherwise processed so as to produce tabs, fold lines, and other features. The sheet can then be folded along the fold lines such that the tabs and/or other portions of the precut sheet overlap. One or more of the overlapping areas are then joined together, such as by gluing.

In one embodiment of the present invention, an apparatus for producing corrugated products includes a base, a feeding station, a folding station, and a welding station. The base includes a support structure having a pair of lateral supports, a first intermediate support positioned between the lateral supports, a second intermediate support positioned between the lateral supports, a first retaining member positioned on one of lateral supports, a second retaining member positioned on the other lateral support, a backing member positioned on the first intermediate support, and a third retaining member positioned above the first intermediate support. The feeding station includes a pair of rollers, a first upper conveyor belt, a second upper conveyor belt, a first lower conveyor belt positioned below the first upper conveyor belt, and a second lower conveyor belt positioned below the second upper conveyor belt. The folding station includes a first ramp, a second ramp, a first pair of arms, and a second pair of arms. The welding station includes a welding unit, a first upper conveyor belt, a second upper conveyor belt, a first lower conveyor belt positioned below the first upper conveyor belt, a second lower conveyor belt positioned below the second upper conveyor belt, and a support roller positioned beneath the backing member.

In one embodiment, the apparatus further includes at least on pusher connected to the base. In certain embodiments, the pusher is adjacent the first intermediate support. In other embodiments, the apparatus includes a drive system for moving the pusher along the first intermediate support. In one embodiment, the pusher is selectively retractable and extendable.

In certain embodiments, the welding unit includes a rotary sonic welder. In other embodiments, the welding unit includes a welding head having a welding surface disposed around the welding head. In one embodiment, the welding surface includes an alternating series of projections and recesses. In certain embodiments, the projections are rectangular. In one embodiment, the recesses are semicircular in cross section. In one embodiment, the welding head can be selectively raised and lowered.

In another embodiment, the apparatus further includes a roller positioned below the welding surface of the welding head.

In one embodiment of the present invention, a method for producing a corrugated product includes providing a corrugated sheet having a first section and a second section, folding the corrugated sheet so that the first section and the second section have an area of overlap, providing a rotary sonic welder having a welding head, contacting the welding head with the area of overlap, rotating the welding head, and actuating the welding head so as to join the first and second sections of the sheet in the area of overlap.

In one embodiment, the sheet is a corrugated plastic sheet. In certain embodiments, the sheet is continuously moved while the welding head is in contact with the area of overlap. In another embodiment, the welding head is intermittently actuated.

In other embodiments, the sheet has a third section and the method further includes providing a backing member between the area of overlap and the third section to prevent welding the area of overlap to the third section.

These and other features of the present invention will be apparent to those of ordinary skill in the art from the following Detailed Description of Embodiments of the Invention and the accompanying drawings.

DETAILED DESCRIPTION OF THE EMBODIMENTS OF THE INVENTION

Figure 1:
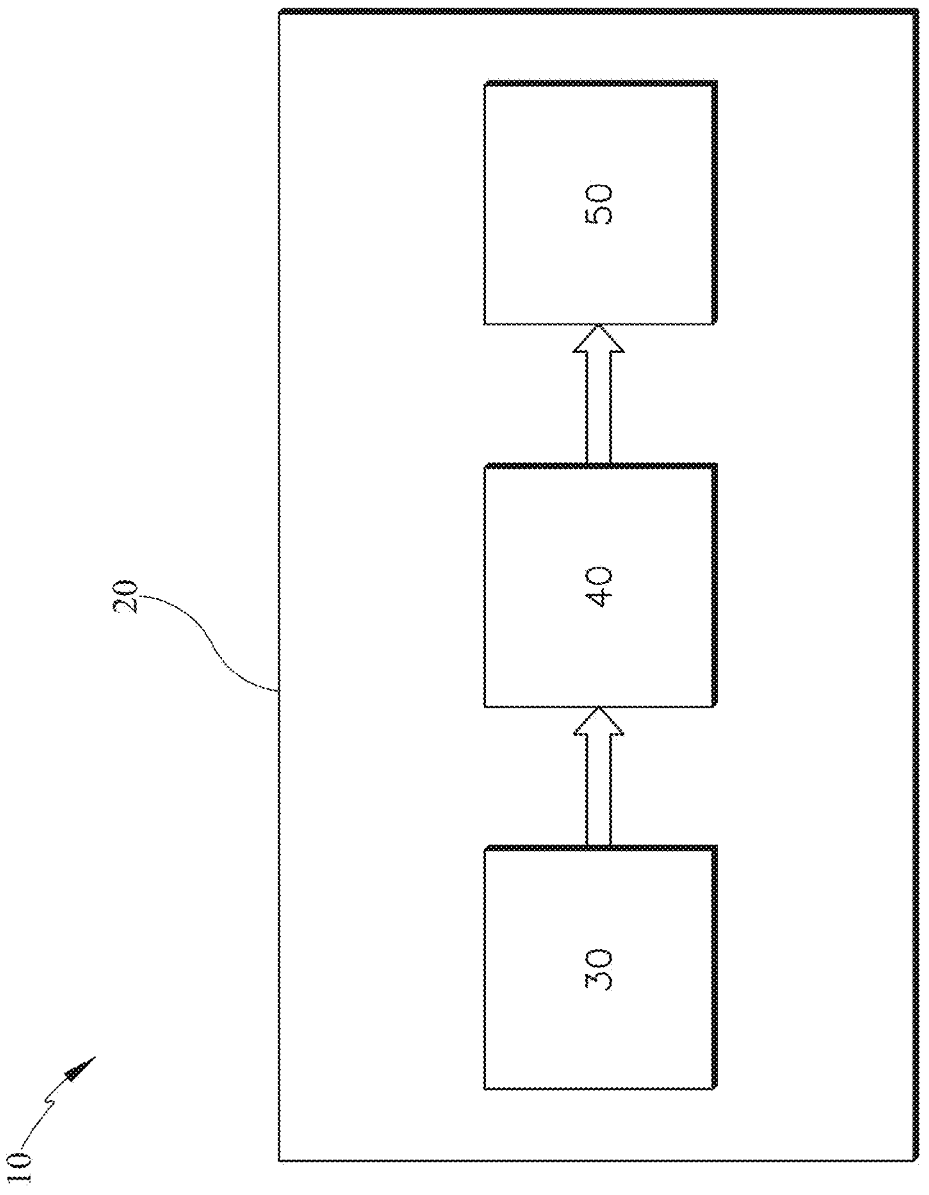
FIG. 1 is a schematic representation of an apparatus for producing corrugated products according to one embodiment of the present invention.

FIG. 1 is a schematic representation of an apparatus for manufacturing corrugated products according to one embodiment of the present invention. In FIG. 1, the apparatus is schematically represented as a machine 10 that generally includes a base 20, a loading or feeding station 30, a folding station 40, and a welding station 50. Machine 10 is designed to, among other things, fold a precut corrugated plastic sheet, such as, for example a sheet 60 (FIG. 3) and join at least one portion of the sheet to another portion of the sheet as described in greater detail below.

Figure 2:
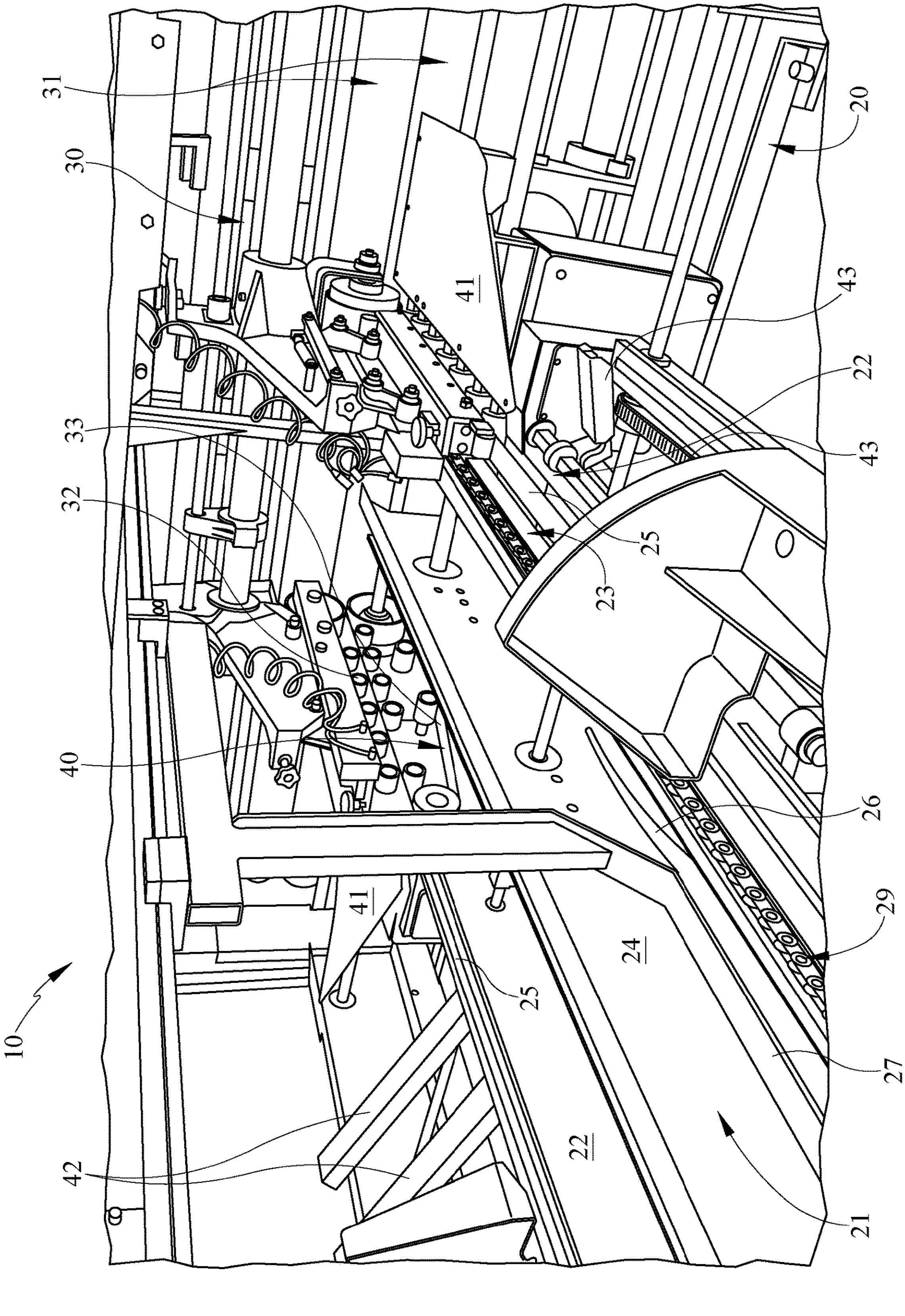
FIG. 2 is a perspective view of a feeding station and a folding station that are features of an apparatus for producing corrugated products according to one embodiment of the present invention.

Referring to FIG. 2, base 20 generally includes a support structure 21. In the embodiment shown, support structure 21 includes a pair of lateral supports 22, a first intermediate support 23 positioned between lateral supports 22, a second intermediate support 24 positioned between lateral supports 22, a pair of retaining members 25 each one of which is positioned on one of lateral supports 22, a backing member or anvil 26 positioned on first intermediate support 23, and a third lateral retaining member 27 positioned above first intermediate support 23 between folding station 40 and welding station 50. In the embodiment shown, retaining members 25 and backing member 26 are made from a flexible, metallic material, such as spring steel. Base 20 further includes a plurality of retractable and extendable drive members or pushers 28. In the embodiment shown, pushers 28 are positioned adjacent first intermediate support 23 and second intermediate support 24 and are driven along the length of machine 10 by drive systems 29 supported by base 20. In the embodiment shown, drive systems 29 are chain driven mechanisms. Pushers 28 move sheets 60 from folding station 40 toward welding station 50 as described below. Support structure 21 supports sheets 60 and maintains them in the desired position within machine 10 as sheets 60 move along machine 10 from feed station 30 to discharge station 60 as described below.

Figure 3:
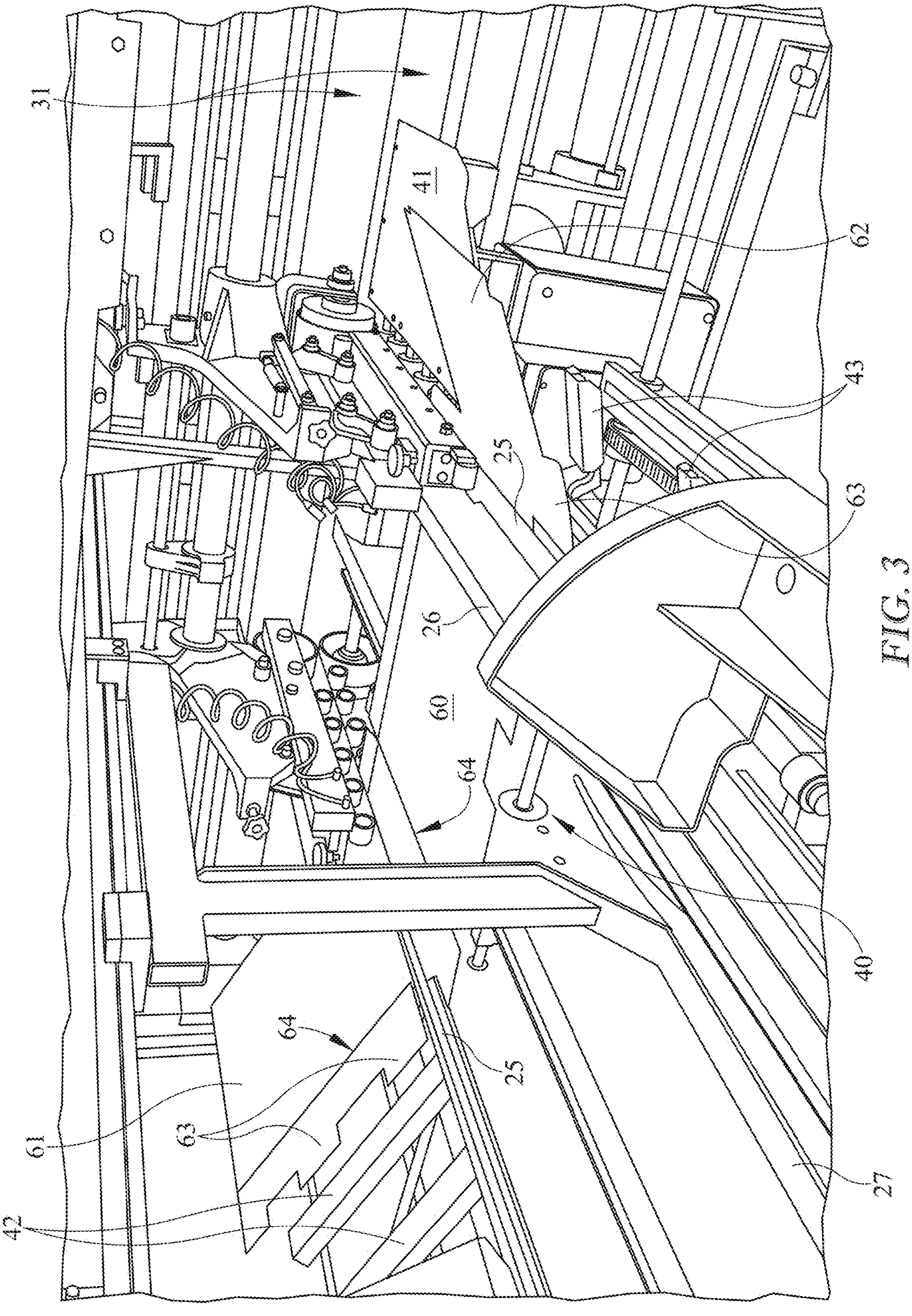
FIG. 3 is a perspective view of a corrugated sheet being processed at the folding station shown in FIG. 2.
Figure 4:
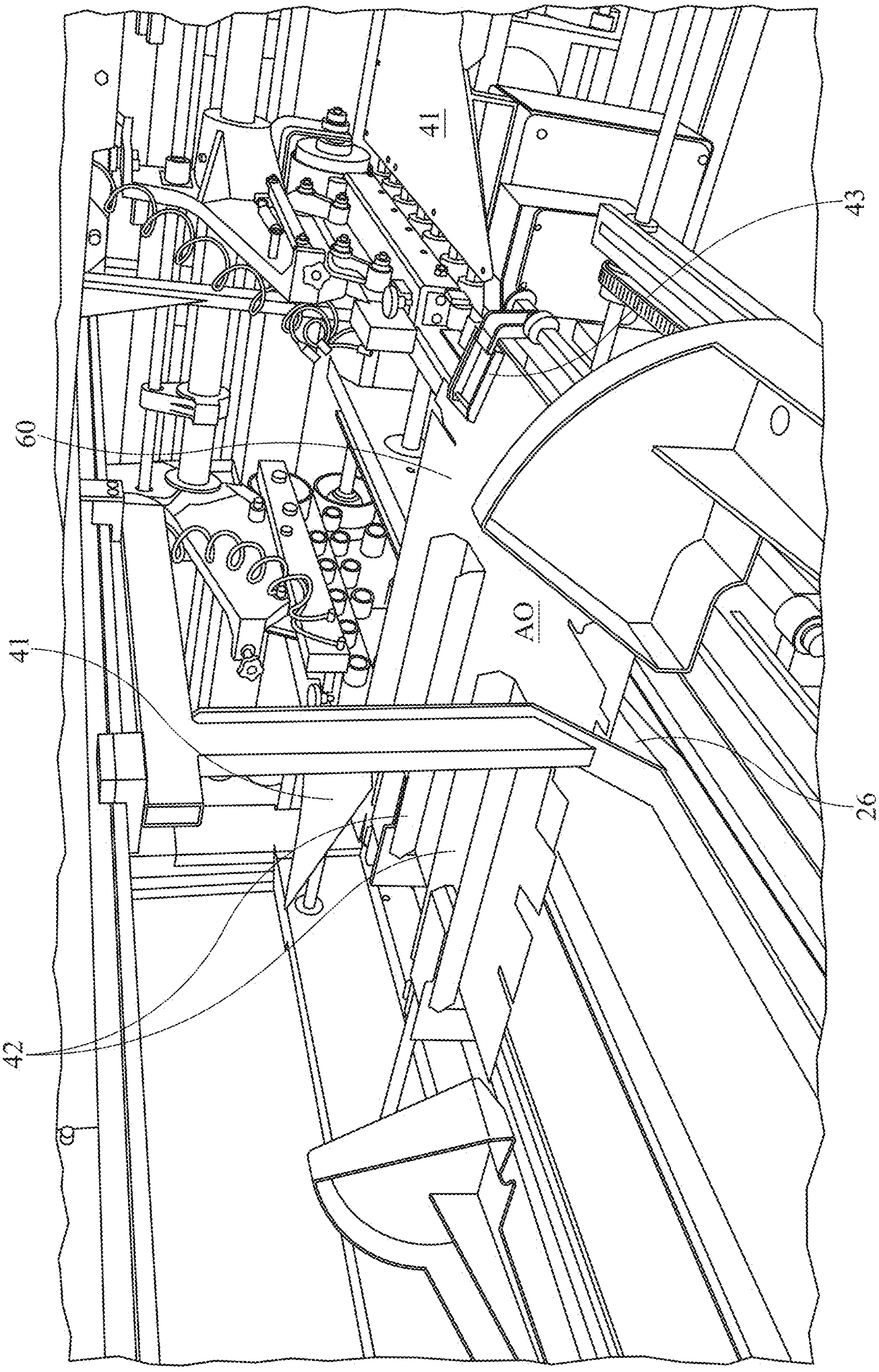
FIG. 4 is a perspective view of the sheet shown in FIG. 3 folded by the folding station shown in FIG. 2.

Referring to FIGS. 2-4, feeding station 30 includes a pair of opposed rotatable rollers 31, a pair of opposed upper conveyor belts 32, and a pair of opposed lower conveyor belts 33. Each upper conveyor belt 32 is positioned above a lower conveyor belt 33. One or both of rollers 31, upper conveyor belts 32, and lower conveyor belts 33 may be driven by any of number of known mechanisms, such as an electric motor or other means, to rotate rollers 31 and to drive upper conveyor belts 32 and lower conveyor belts 33. In one embodiment of the invention, an operator OP feeds sheets 60 between rollers 31. Rollers 31, upper conveyor belts 32, and lower conveyor belts 33 are sized and spaced such that when a sheet 70 is fed between rollers 31, rollers 31 engage the upper and lower surfaces of sheet 60 and propel it between upper conveyor belts 32 and lower conveyor belts 33, which in turn convey sheet 60 toward folding station 30. In alternative embodiments of the invention, sheets 60 are automatically fed to rollers 31, such as from an automated hopper feeding system.

Folding station 40 generally incudes a pair of laterally opposed ramps 41, a first pair of arms 42, and a second pair of arms 43. Arms 42 and 43 are, in the embodiment show, positioned on opposite sides of lateral supports 22. Also in the embodiment shown, arms 42 are longer than arms 43.

Figure 6:
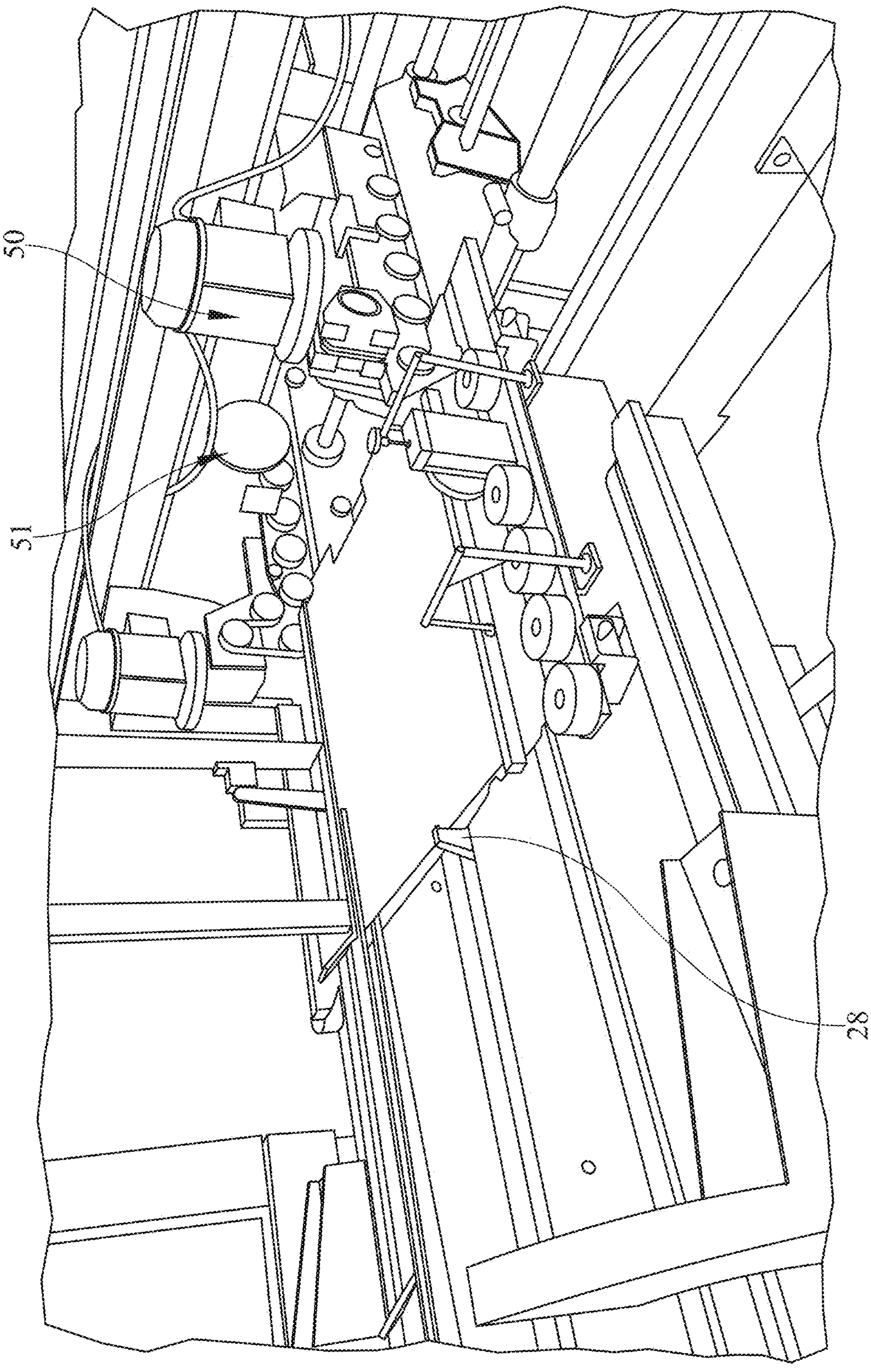
FIG. 6 is a perspective view of the sheet shown in FIG. 3 at a welding station that is a feature of the apparatus shown in FIG. 2.
Figure 7:
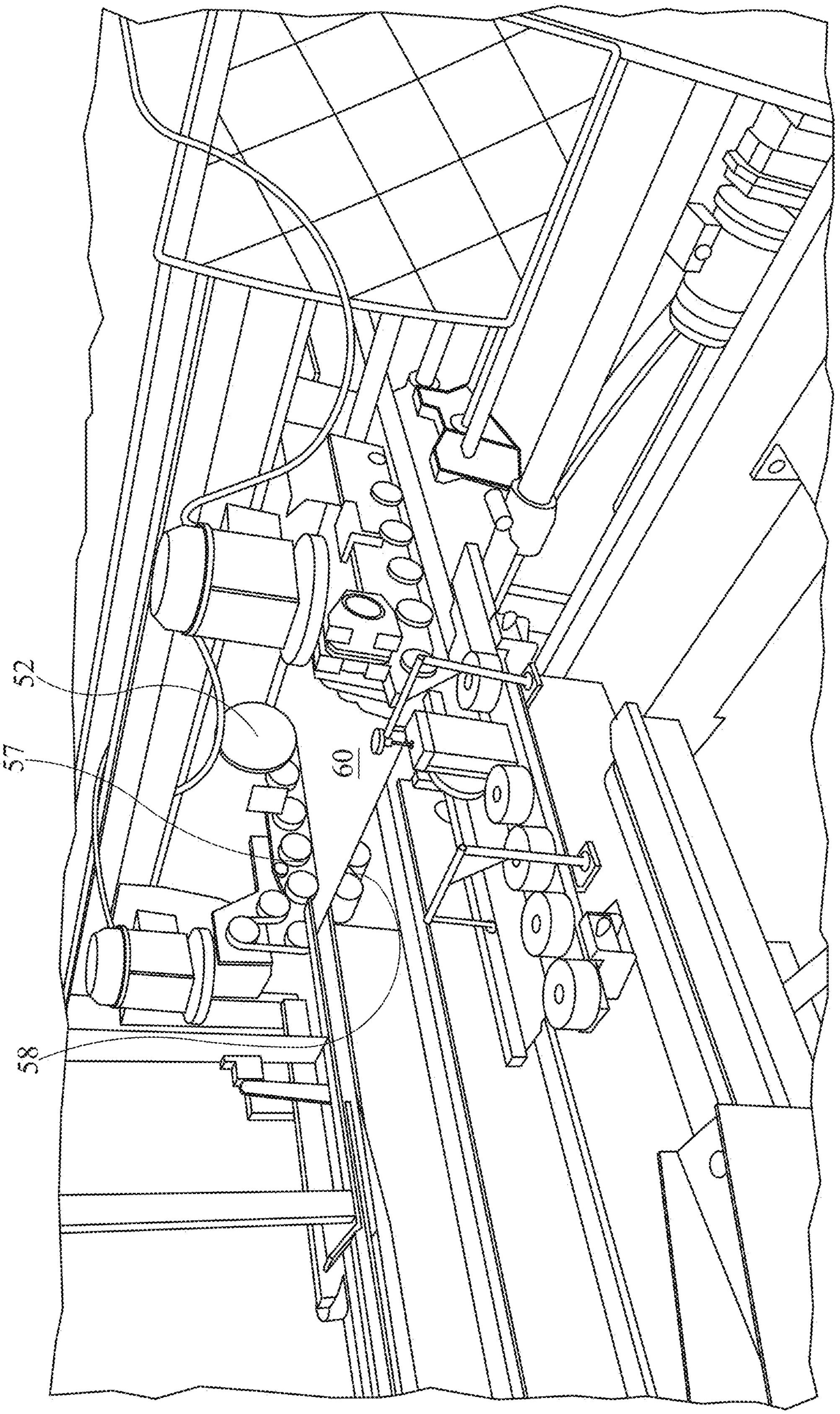
FIG. 7 is a perspective view of the welding station shown in FIG. 6 welding the sheet shown in FIG. 3.
Figure 8:
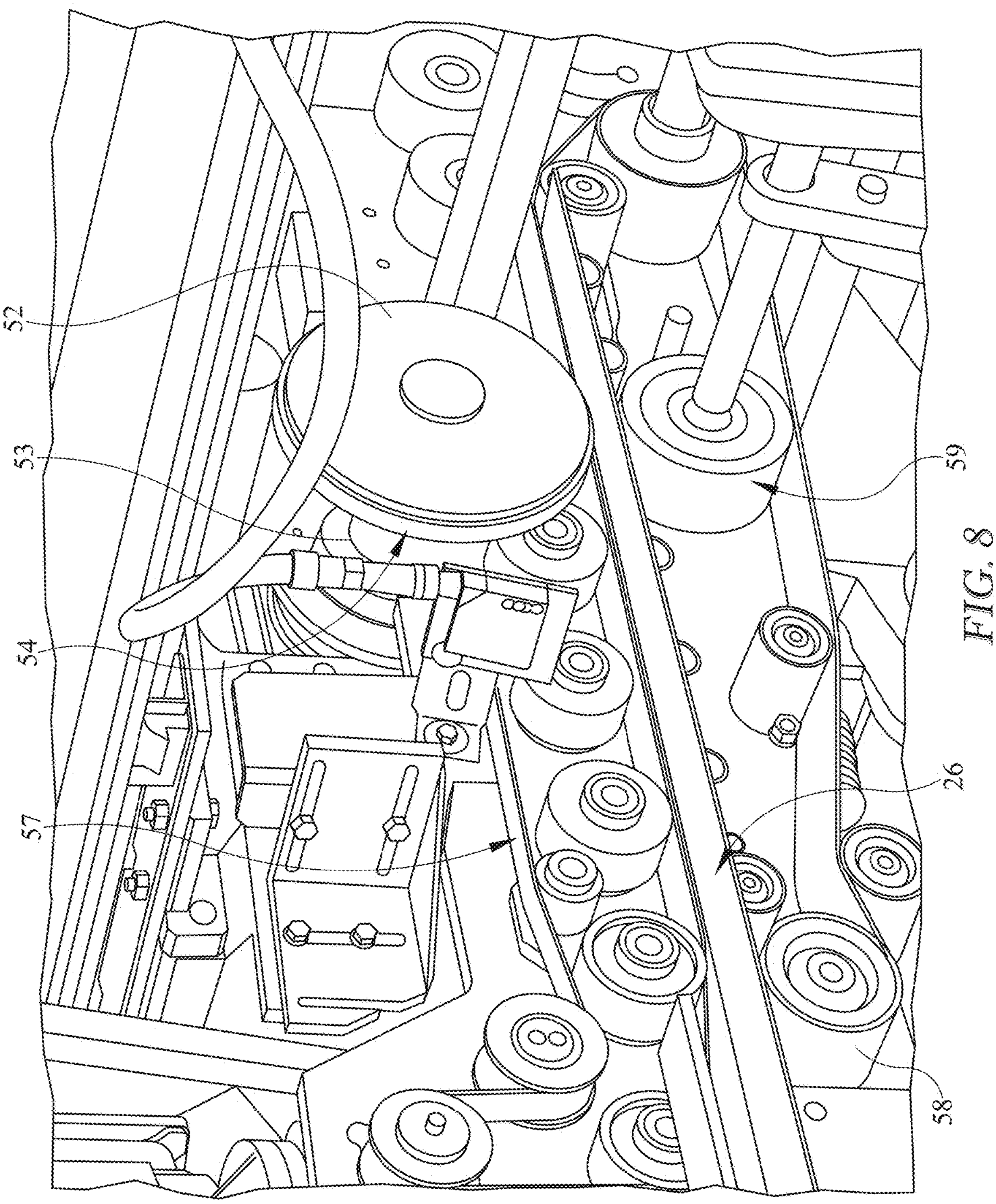
FIG. 8 is a perspective view of the welding unit that is a component of the welding station shown in FIG. 6.
Figure 9A:
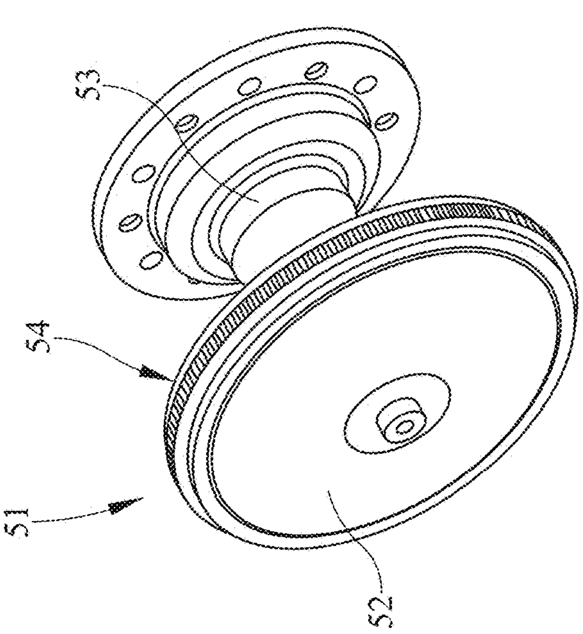
FIGS. 9A-9D illustrate a welding head that is a component of the welding station shown in FIG. 6.
Figure 9B:
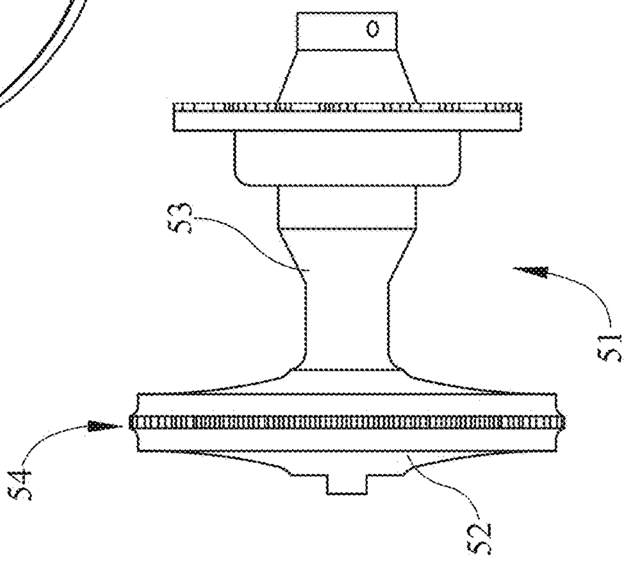
Figure 9C:
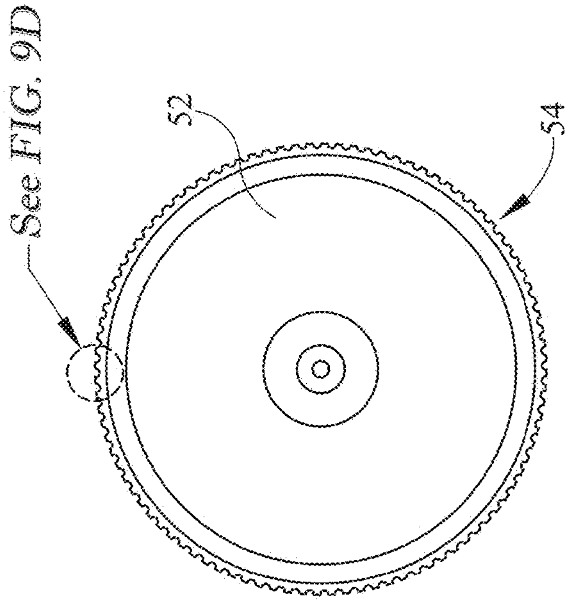
Figure 9D:
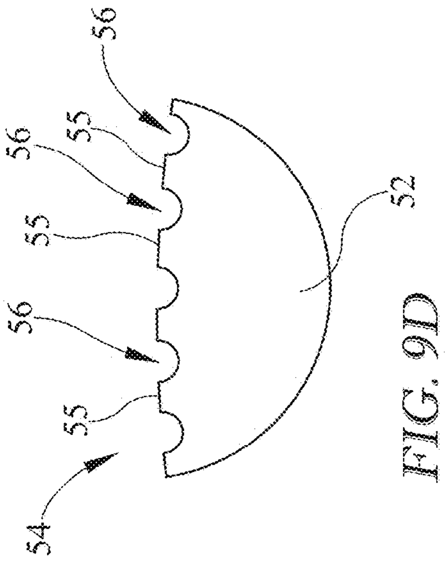

Referring to FIGS. 6-8, welding station 50 generally includes a welding unit 51, a pair of opposed upper conveyor belts 57, a pair of opposed lower conveyor belts 58, and a backing or support roller 59. In the embodiment shown, welding unit 51 is a rotary sonic welder having a welding head 52 and a shaft 53. Welding head 52 (FIGS. 9A-9D) includes a welding surface 54 formed around the circumference of welding head 52. In the embodiment shown, welding surface 54 has an alternating series of generally rectangular raised areas or projections 55 separated by generally half-cylinder shaped valleys or recessed areas 56. In the embodiment shown, projections 55 are approximately 0.228 inch by 0.1 inch and recessed areas 56 have a radius of approximately 0.049 inch. Welding head 52 rotates with shaft 53 and can be selectively raised and lowered to carry out welding operations as described below. Each upper conveyor belt 57 is positioned above a lower conveyor belt 58. Upper conveyor belts 57, and lower conveyor belts 58 may be driven by any of number of known mechanisms, such as an electric motor or other means, to drive upper conveyor belts 57 and lower conveyor belts 58. Support roller 59, in the embodiment shown, is positioned beneath backing member 26.

Sheet 60 (FIG. 3) in the embodiment shown are corrugated plastic sheets that have been precut as blanks for use as packaging, such as boxes. Sheet 60 in the embodiments shown has a first section 61, a second section 62, one or more tabs 63 and/or score lines 64.

Referring to FIGS. 3 and 4, sheets 60 may be fed into machine 10 by inserting one edge of a sheet 60 between rollers 31. Rollers 31 will engage the upper and lower surfaces of sheet 60 and convey sheet 60 between upper conveyer belts 32 and lower conveyor belts 33. Upper conveyor belts 32 and lower conveyor belts 33 convey sheet 60 beneath retaining members 25 and backing member 26 and over ramps 41. Contact between first section 61 and second section 62 of sheet 60 with ramps 41 causes first section 61 and second section 62 to fold upwardly along adjacent score lines 65. As sheet 60 continues to move through folding station 40, arms 42 and 43 rotate toward first intermediate support 23 and second intermediate support 24 and engage first section 61 and second section 62 of sheet 60 to fold first section 61 and second section 62 over retaining members 25 and backing member 26. Note that movement of arms 42 and 43 is timed such that one pair of arms completes its folding operation prior to the other pair of arms. For example, in the embodiment shown, second arms 43 compete their folding operation before first arms 42, which results in first section 61 of sheet 60 overlapping second section 62 of sheet 60 in an area of overlap AO. The area of overlap AO is positioned above backing member 26.

Figure 5:
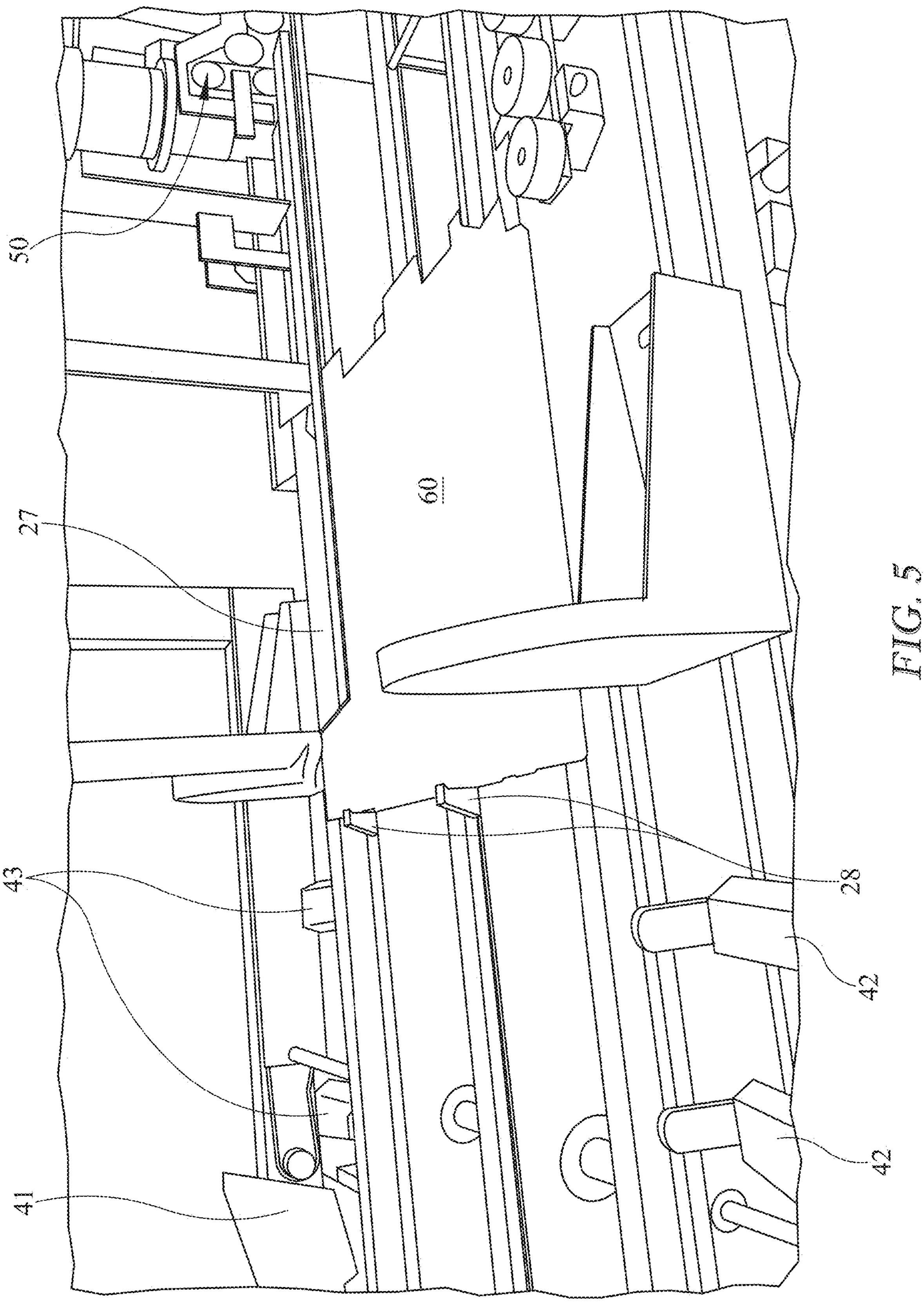
FIG. 5 is a perspective view of the sheet shown in FIG. 3 advancing to a welding station that is a feature of the apparatus shown in FIG. 2.

After folding, pushers 28 extend and drive sheet 60 beneath third lateral retaining member 27 and between upper conveyor belts 57 and lower conveyor belts 58 of welding station 50 (FIGS. 5 and 6). Pushers 28 retract after upper conveyor belts 57 and lower conveyor belts 58 engage sheet 60 to convey sheet 60 to welding unit 51. As area of overlap AO moves toward welding unit 51, welding head 52 is rotated and lowered so as to contact area of overlap AO. Weld head 52 is also activated so as to vibrate and sonically weld area of overlap AO. Specifically, the overlapping portions of sheet 70 are sonically welded together at the locations contacted by projections 55 of welding head 51. In certain embodiments of the invention, welding head 52 is intermittently activated as area of overlap AO passes beneath welding head 52. Placement of support roller 59 beneath backing member 26 provides support against the pressing force of welding head 52. Note that the placement of backing member 26 beneath welding head 51 prevents portions of sheet 60 that are beneath area of overlap AO from being joined together by welding head 52. In one embodiment of the invention, sheet 60 is continuously moved beneath welding head 52 during the welding operation. After welding, sheet 60 is discharged or manually removed from machine 10.

Figure 10A:
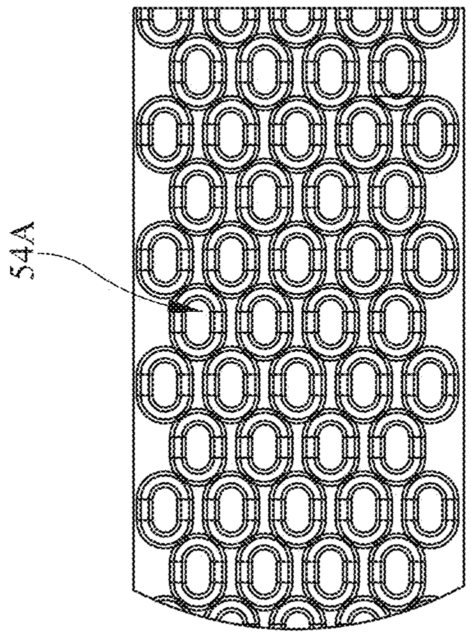
FIGS. 10A and 10B illustrate an alternative embodiment of a welding surface that is a component of an apparatus for producing corrugated products according to the present invention.
Figure 10B:
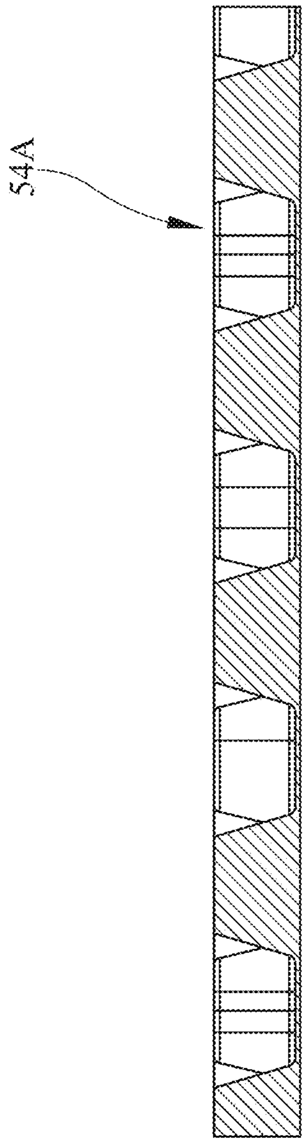

Although the invention has been shown and described in detail, the same is for purposes of illustration only and is not a limitation on the invention. Various modifications can be made to the specific embodiments disclosed without departing from the scope of the invention. For example welding surface 54 of welding head 52 can have a pattern other than that illustrated, such as that shown in FIGS. 10A and 10B, in which welding surface 54A has a honeycomb-like pattern. The present invention can also be carried out utilizing sheets 60 other than those of the specific configurations illustrated. Other modifications are also within the scope of the invention.

What is claimed is:

1. An apparatus for producing corrugated products, including:

a base having a support structure, the support structure including a pair of lateral supports, a first intermediate support positioned between the lateral supports, a second intermediate support positioned between the lateral supports, a first retaining member positioned on one of the lateral supports, a second retaining member positioned on the other lateral support, a backing member positioned on the first intermediate support, and a third retaining member positioned above the first intermediate support;

a feeding station, the feeding station including a pair of rollers, a first upper conveyor belt, a second upper conveyor belt, a first lower conveyor belt positioned below the first upper conveyor belt, and a second lower conveyor belt positioned below the second upper conveyor belt;

a folding station, the folding station including a first ramp, a second ramp, a first pair of arms, and a second pair of arms; and a welding station, the welding station including a welding unit, a third upper conveyor belt, a fourth upper conveyor belt, a third lower conveyor belt positioned below the third upper conveyor belt, a fourth lower conveyor belt positioned below the fourth upper conveyor belt, and a support roller positioned beneath the backing member.

2. The apparatus for producing corrugated products according to claim 1, further including at least one pusher connected to the base.

3. The apparatus for producing corrugated products according to claim 2, wherein the pusher is adjacent the first intermediate support.

4. The apparatus for producing corrugated products according to claim 3, further including a drive system for moving the pusher along the first intermediate support.

5. The apparatus for producing corrugated products according to claim 2, wherein the pusher is selectively retractable and extendable.

6. The apparatus for producing corrugated products according to claim 1, wherein the welding unit includes a rotary sonic welder.

7. The apparatus for producing corrugated products according to claim 1, wherein the welding unit includes a welding head having a welding surface disposed around the welding head.

8. The apparatus for producing corrugated products according to claim 7, wherein the welding surface includes an alternating series of projections and recesses.

9. The apparatus for producing corrugated products according to claim 8, wherein the projections are rectangular.

10. The apparatus for producing corrugated products according to claim 8, wherein the recesses are semicircular in cross section.

11. The apparatus for producing corrugated products according to claim 7, wherein the welding head can be selectively raised and lowered.

12. The apparatus for producing corrugated products according to claim 7, further including a roller positioned below the welding surface of the welding head.

* * * * *